United States Patent
Rogg

(10) Patent No.: US 12,553,416 B2
(45) Date of Patent: Feb. 17, 2026

(54) WIND TURBINE DRIVETRAIN

(71) Applicant: Siemens Gamesa Renewable Energy A/S, Brande (DK)

(72) Inventor: Andreas Rogg, Hamburg (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 18/929,697

(22) Filed: Oct. 29, 2024

(65) Prior Publication Data

US 2025/0146476 A1   May 8, 2025

(30) Foreign Application Priority Data

Nov. 3, 2023 (EP) .................................. 23207722

(51) Int. Cl.
*F16H 57/023* (2012.01)
*F03D 15/00* (2016.01)
*F03D 80/50* (2016.01)
*F16H 57/02* (2012.01)

(52) U.S. Cl.
CPC .......... *F03D 80/504* (2023.08); *F03D 15/00* (2016.05); *F16H 57/023* (2013.01); *F05B 2230/80* (2013.01); *F05B 2260/40311* (2013.01); *F16H 2057/02034* (2013.01); *F16H 2057/02078* (2013.01); *F16H 2057/0235* (2013.01)

(58) Field of Classification Search
CPC .................. F03D 15/00; F05B 2230/80; F05B 2260/40311; F16H 57/023; F16H 2057/02034; F16H 2057/02078; F16H 2057/0235
See application file for complete search history.

(56) References Cited

U.S. PATENT DOCUMENTS

| 4,240,762 A * | 12/1980 | Lobanoff ............. F04D 29/044 403/287 |
| 9,790,916 B2 | 10/2017 | Valero Lafuente |
| 11,927,176 B2 * | 3/2024 | Demissie ............... F03D 80/80 |
| 2010/0129216 A1 | 5/2010 | Bagepalli et al. |

(Continued)

FOREIGN PATENT DOCUMENTS

| DE | 29817382 U1 | 2/1999 |
| EP | 2299108 A2 | 3/2011 |

(Continued)

*Primary Examiner* — Farhana Pervin
(74) *Attorney, Agent, or Firm* — Schmeiser, Olsen & Watts, LLP

(57) ABSTRACT

A wind turbine drivetrain is provided, including a low-speed shaft; a high-speed assembly including a planetary gearbox and a generator; a coupling assembly including a first annular part connected to the low-speed shaft, a second annular part connected to a first stage of the planetary gearbox, and a cylindrical intermediate part extending between the annular parts, a drivetrain housing arranged to enclose the low-speed shaft and the coupling assembly; having an outer access opening formed in the drivetrain housing; and an inner access opening formed in the intermediate part of the coupling assembly and arranged to align with the outer access opening to facilitate access to the interior of the coupling assembly. Also, further described is a method of performing a maintenance procedure on such a wind turbine drivetrain.

15 Claims, 9 Drawing Sheets

(56) References Cited

U.S. PATENT DOCUMENTS

| | | | |
|---|---|---|---|
| 2012/0263602 A1 | 10/2012 | Booth | |
| 2013/0236311 A1 | 9/2013 | Segovia et al. | |
| 2015/0354233 A1 | 12/2015 | Ebbesen et al. | |
| 2018/0328347 A1* | 11/2018 | Rogg | F16F 13/08 |
| 2020/0318617 A1* | 10/2020 | Albizua Macua | F03D 13/20 |
| 2022/0397096 A1* | 12/2022 | De Vries | F16H 57/02 |

FOREIGN PATENT DOCUMENTS

| | | |
|---|---|---|
| EP | 3168461 A1 | 5/2017 |
| ES | 2206028 A1 | 5/2004 |

* cited by examiner

WIND TURBINE DRIVETRAIN

CROSS REFERENCE TO RELATED APPLICATIONS

This application claims priority to EP Application Serial No. 23207722.2, having a filing date of Nov. 3, 2023, the entire contents of which are hereby incorporated by reference.

FIELD OF TECHNOLOGY

The following relates to a wind turbine drivetrain.

BACKGROUND

A widely-used design for a wind turbine drivetrain comprises a low-speed shaft coupled to a planetary gearbox, and a generator mounted to the gearbox. The low-speed shaft is supported by a housing in place about a bearing assembly (usually comprising a front bearing about the upwind region of the low-speed shaft, and a rear-bearing about the downwind region of the low-speed shaft), and this "main bearing housing" is secured to a nacelle bedplate so that loads can be transferred to the wind turbine tower. The coupling assembly and the gearbox-generator module can be attached to the main bearing housing in cantilever, so that the torque reaction as well as the gearbox-generator module weight is essentially supported by the main bearing housing.

SUMMARY

A conventional type of coupling (between low-speed shaft and gearbox) consists of two annular disks or plates, one of which is connected to the low-speed shaft, and one of which is connected to the gearbox first stage. The plates are shaped to extend radially outward, i.e., the outer diameter of an annular plate is larger than the diameter of the downwind end of the low-speed shaft. The annular plates, which can be similar in size, are joined about their outer perimeters by a relatively short annular connecting part or "hollow shaft". The hollow shaft is as short as possible to assist in transferring loads from the gearbox-generator assembly to the main bearing housing and nacelle bedplate. A short coupling assembly also helps achieve a favourably compact drivetrain. This type of coupling assembly design can be because the flexibility of the annular plates, in combination with the spatial separation achieved by the hollow shaft, allows for radial as well as angular displacement of the gearbox input shaft relative to the low-speed shaft.

However, a drawback of this design is that the annular connecting part does not allow access to the fasteners that connect the annular plates to the low-speed shaft and gearbox. It is also not possible to provide access to the fasteners through apertures in the annular plates, since any such apertures would alter the flexion and torsion properties of the annular plates, detracting from their purpose as coupling components in this type of drivetrain.

One way of dealing with this problem is to engineer the coupling assembly to ensure that the fasteners do not require any maintenance over the entire service life of the wind turbine, which can be in excess of 20 years. However, such "maintenance-free" design is expensive and adds significantly to the overall cost of the wind turbine. An aspect of embodiments of the invention provide an improved drivetrain design that overcomes the problems outlined above.

An aspect of embodiments of the invention is achieved by the claimed wind turbine drivetrain and by the claimed method of performing a maintenance procedure.

As described above, the type of wind turbine drivetrain discussed herein comprises a low-speed shaft or "main shaft", a planetary gearbox and a coupling assembly between the main shaft and the gearbox. According to embodiments of the invention, the coupling assembly comprises a first annular part connected to the main shaft, a second annular part connected to the planetary gearbox, and an essentially hollow cylindrical intermediate part extending between the annular parts. A housing is provided to enclose the main shaft and the coupling assembly, since it is important to prevent contaminants from entering or leaving the space between the main shaft and gearbox. The inventive wind turbine drivetrain is characterized by an outer access opening formed in the drivetrain housing, and an inner access opening formed in the intermediate part of the coupling assembly and arranged to align with the outer access opening to facilitate access to the interior of the coupling assembly.

According to embodiments of the invention, an annular part of the coupling assembly can be referred to as a coupling part and can be in the form of an essentially flat plate or disk. A coupling part may also be referred to herein as a plate or disk. Such a coupling part can be ring-shaped with a central opening, since the components to be coupled are the annular end of the main shaft, and the annular arrangement of planetary gears of the first gearbox stage.

According to embodiments of the invention, the intermediate part shall be understood to comprise a hollow, essentially cylindrical, component with a suitable diameter (e.g., similar to the diameter of a coupling plate), and a length that is as short as possible. The diameter of the intermediate part is therefore considerably larger than its length, so that the intermediate part has the shape of a shallow ring. Since this ring links the coupling disks, it may be referred to herein as a linking ring. The coupling disks and the linking ring together define an enclosed space in the interior of the coupling assembly. As will be explained below, the linking ring can be detached from one or both coupling plates in order to decouple the main shaft from the gearbox.

An embodiment of the inventive construction is that, even if the enclosed space in the interior of the coupling assembly is very constrained owing to the shallow or short linking ring, a technician is given access to components in the interior of the coupling part and can perform a maintenance procedure with relative ease. Since the inventive approach facilitates access to components in the interior of the coupling part, this part of the drivetrain need not be "over-engineered" to avoid maintenance over the service life of the wind turbine. Instead, the coupling between main shaft and gearbox can be realized at favourably low cost using relatively cheap "standard" bolted connections that can be expected to require maintenance at intervals during the service life of the wind turbine. In the inventive drivetrain design, accessibility to the interior of the coupling assembly is included, while maintaining the favourably short coupling assembly length. In other words, the length of the coupling assembly does not need to be extended in order to provide access to the fasteners in its interior.

Maintenance procedures to the coupling part components can be scheduled along with other routine inspections or maintenance routines, so that the inventive drivetrain design does not incur significant costs during the wind turbine service life.

According to embodiments of the invention, the method of performing a maintenance procedure on such a wind turbine drivetrain comprises the steps of turning a drivetrain unit to align the inner opening in the intermediate part with the outer opening in the drivetrain housing, and subsequently accessing a number of components in the interior of the coupling assembly through the aligned openings. The now accessible components can be manipulated as appropriate, for example fasteners can be tightened or loosened as required, fastener preload may be checked and adjusted as necessary, etc.

In the following, without restricting embodiments of the invention in any way, it may be assumed that the length of the drivetrain is in the order of 8-10 m, and the diameter at the coupling region can be in the order of 1-2 m. For various reasons, the length of the drivetrain should be kept as short as possible, and embodiments of the invention provide a way of constructing a favorably compact coupling assembly. In an exemplary embodiment of the invention, the length of the coupling assembly (i.e., the distance between the non-drive end of the main shaft and the first stage of the planetary gearbox) is at most 1.0 m, more desirably at most 0.7 m.

As explained above, a drivetrain housing encloses the main shaft and the coupling assembly. In an exemplary embodiment of the invention, the drivetrain housing comprises a first housing section shaped to enclose the front and rear bearings in place about the main shaft, and a second housing section that is shaped to enclose the coupling assembly. In the following, the housing section in place about the main shaft and its bearings can be referred to as the main bearing housing; the housing section in place about the coupling assembly can be referred to as the coupling housing. The upwind end of the coupling housing is secured to the downwind end of the main bearing housing. The downwind end of the coupling housing is secured to the planetary gearbox. In this way, the main shaft and bearings, as well as the coupling assembly, are protected from airborne contaminants. A further purpose of the drivetrain housing is to connect to the gearbox housing, which in turn supports the generator in cantilever fashion. Structural loads are passed via the gearbox housing and drivetrain housing to the nacelle bedplate and from there to the tower.

Some deformation of this type of drivetrain occurs unavoidably during operation of the wind turbine, due to weight load of the gearbox-generator module and any misalignment of the gearbox input shaft with respect to the main shaft. A drivetrain is generally designed with the aim of keeping such deformations within a range that can be accommodated by the coupling assembly in all operating conditions. As described above, a compact drivetrain length is also desirable. The coupling assembly of the inventive drivetrain is therefore as short as possible, while at the same time having sufficient stiffness, since the stiffness of the coupling assembly and coupling housing determines the deformation behavior of the drivetrain to some extent. Since the access openings in the coupling housing and the linking ring mean that material is effectively "removed" from these parts, the desired degree of stiffness is achieved by "adding" material, for example by increasing the wall thickness in other areas of the coupling housing and the coupling assembly.

In an exemplary embodiment of the invention, the access openings are arranged to align when the low-speed shaft is turned to a predetermined position, i.e., a "locked" or "maintenance" position. The size of an outer access opening need not be any larger than the size of an inner access opening. In this way, the size of the openings can be kept to a favorable minimum, so that provision of the access openings does not have a detrimental effect on the structural strength of the coupling assembly and coupling housing.

In an exemplary embodiment of the invention, a cover or hatch can be provided at least for the outer access openings and/or the inner access openings. A cover is shaped to exactly fit into the respective access opening, so that it can contribute to the stiffness of the housing.

The first annular part of the coupling assembly is secured to the non-drive end of the main shaft by an annular arrangement of fasteners inserted into corresponding threaded bores formed in the non-drive end of the main shaft. These are axially aligned, i.e., the shaft of a fastener is parallel to the drivetrain rotation axis of the drivetrain and inserted in the upwind direction. These fasteners are referred to herein as the "upwind-facing inner fasteners". Similarly, the second annular part of the coupling assembly is secured to the first stage of the planetary gearbox by a second annular arrangement of fasteners inserted into corresponding threaded bores formed in the planetary gearbox first stage. These are axially aligned, i.e., the shaft of a fastener is parallel to the drivetrain rotation axis of the drive train, and inserted in the downwind direction. These fasteners are referred to herein as the "downwind-facing inner fasteners". Without restricting embodiments of the invention in any way, it may be assumed that such a fastener is a metal screw with a hexagonal or "hex" head, and that the hex heads of the fasteners are accessible from within the coupling assembly. The upwind-facing and downwind-facing inner fasteners used in the coupling assembly of a drivetrain with the dimensions given above can be standard bolts with a size in the order of M48-M100. Equally, expansion bolts or multi-jackbolt tensioners could be used.

When a wind turbine drivetrain is shut down for a maintenance routine, one or more rotary parts can be "locked" to prevent their movement until it is safe to re-start the wind turbine. For example, the generator rotor can be held stationary by a brake disk. The locked generator rotor prevents rotation of any upwind components in the gearbox, and therefore also the coupling assembly and the main shaft. As a result, after completion of a shut-down sequence, the position of the coupling assembly relative to the drivetrain housing may be essentially random, and the outer access opening (in the drivetrain housing) and inner access opening (in the intermediate part of the coupling assembly) may not be in alignment. In an exemplary embodiment of the inventive method, a drive unit can be deployed to turn the gearbox/generator shaft to effect a rotation of the gearbox first stage and coupling assembly (relative to the main shaft) to bring the openings into alignment. The drive unit used for this purpose can be equipment installed in the nacelle for this purpose. Equally, the drive unit can be the generator itself. Alternatively, or in addition, the step of turning a drivetrain component to align the openings can be done by effecting a rotation of the low-speed shaft (relative to the gearbox input shaft). This can be done for example using an external drive unit attached to the low-speed shaft.

As explained above, the coupling assembly comprises two annular plates joined by an intermediate part or linking ring. In an exemplary embodiment of the invention, an annular plate is secured to the linking ring by an arrangement of outer fasteners, i.e., fasteners that are accessible from the outside of the coupling assembly. In an exemplary embodiment of the invention, the upwind and downwind ends of the linking ring are formed as inwardly-facing or outwardly-facing flanges. Depending on the choice of flange design, an outer fastener can be inserted through a hole provided in the perimeter of an annular plate and threaded into a matching threaded blind hole provided in an outwardly-facing flange; alternatively an outer fastener can be inserted through a hole provided in the inwardly-facing flange and threaded into a matching threaded blind hole provided at the perimeter of an annular plate. A first annular arrangement of outer fasteners is used to connect the first annular plate to the linking ring; a second annular arrangement of outer fasteners is used to connect the second annular plate to the linking ring.

The drivetrain housing is constructed to comprise a number of small apertures, each of which is placed to facilitate access to several outer fasteners, so that the coupling plates can be temporarily detached from the linking ring. A first set of (equidistantly arranged) access apertures can be provided for the outer fasteners of the first coupling plate, and a similar set of access apertures can be provided for the outer fasteners of the second coupling plate. For example, each access aperture can facilitate access to three or four outer fasteners, allowing some or all of these to be removed as required during a maintenance procedure.

When one of the decoupled drivetrain parts (e.g., the main shaft) is turned relative to the other drivetrain part (e.g., the gearbox input shaft), a detached coupling plate will turn relative to the linking ring. In an exemplary embodiment of the invention, to avoid friction between the linking ring and a coupling plate, the coupling assembly comprises an arrangement of shims between the linking ring and each coupling plate. As part of the decoupling procedure, the shims can be removed through an opening of the drivetrain housing until needed again.

After aligning the inner opening in the intermediate part with the outer opening in the drivetrain housing, a technician can access the interior of the coupling assembly. For example, a maintenance procedure may require some manipulation of the upwind-facing and/or downwind-facing fasteners. The tools used to loosen such a fastener, and also to re-tighten a fastener with the required torque, may be any suitable power tools such as a bolt tensioning device, a pneumatic impact wrench, a hydraulic socket wrench, a hydraulic puller etc. Such a tool is generally heavy and cumbersome to handle in the restricted space available in the coupling assembly interior, particularly since a technician must hold the tool while reaching in through the aligned access openings. In an exemplary embodiment of the invention, one or more brackets are provided at suitable positions in the interior of the coupling assembly and are shaped to hold or at least partially support a maintenance tool, thereby assisting the technician to perform the maintenance procedure.

The main shaft and/or gearbox input shaft can be turned as required in order to rotate the coupling interface relative to the stationary drivetrain housing so that the next set of outer fasteners can be accessed through the small access apertures. An exemplary sequence of steps is explained in the following. In a preparatory step, most of the outer fasteners are removed from both annular plates, leaving a reduced set of outer fasteners in place. For example, in an embodiment with an annular arrangement of 24 outer fasteners in each annular plate, and four small access windows in the drivetrain housing, 20 outer fasteners are removed from each annular plate, leaving four equidistantly arranged outer fasteners in place, each of which can be accessed through one of the four access windows. In a next step, these remaining outer fasteners can then be removed without having to turn the main shaft and/or gearbox input shaft. After decoupling the drivetrain components in this way, a maintenance procedure can then be carried out. After completion of the maintenance procedure, the coupling assembly is assembled again by carrying out the above steps in reverse: securing the reduced set of outer fasteners through the small access apertures, and then turning the main shaft and/or gearbox input shaft by a suitable amount as often as required in order to rotate the coupling interface relative to the stationary drivetrain housing, so that the next outer fasteners can be inserted and tightened through the access apertures.

In an exemplary maintenance routine, the upwind-facing inner fasteners (connecting the first annular plate to the main shaft) and the downwind-facing inner fasteners (connecting the second annular plate to the gearbox first stage) may need to be adjusted. This can be done in a two-stage procedure, for example, in which the downwind-facing inner fasteners are adjusted in a first stage, and the upwind-facing inner fasteners are adjusted in a second stage. An auxiliary drive unit, mounted for example to the generator or gearbox, is used to effect a rotation of the second coupling plate and anything upwind of the second coupling plate.

Initially, the main shaft is brought into a position in which the inner and outer access openings are aligned and the low-speed shaft is locked. In this position, any accessible downwind-facing inner fastener can be manipulated as required (it is assumed that the gearbox input shaft is locked before manipulating the fasteners in any way). For example, it may be possible for a technician to reach only one downwind-facing inner fastener on each side of the drivetrain. To access the remaining downwind-facing inner fasteners, it is necessary to turn the generator first stage. To this end, as described above, the second annular plate is disconnected from the linking ring by removing the second annular arrangement of outer fasteners. Using the auxiliary drive unit, the gearbox input shaft can then be turned to a new position relative to the main shaft, for example the gearbox input shaft can be turned through 45°. Turning the gearbox first stage results in turning the second annular plate also, but the inner access openings in the linking ring remain aligned with the outer access openings. In the new position, one or more of the remaining downwind-facing inner fasteners can now be adjusted by the technician(s).

These steps are repeated until all of the downwind-facing inner fasteners have been adjusted by the maintenance team. The second annular plate is then connected to the linking ring again by re-inserting and tightening the second annular arrangement of outer fasteners.

In a second stage of the procedure, the upwind-facing inner fasteners are adjusted. Here also, the aligned access openings facilitate access to one or more of the upwind-facing inner fasteners (it is assumed that the low-speed shaft is always locked before manipulating the fasteners in any way). To access the remaining upwind-facing inner fasteners, the main shaft is unlocked and turned (together with the coupling assembly and the gearbox input shaft) using the auxiliary drive unit, through a suitable fraction of a complete revolution, to bring the main shaft into a new position. After turning the main shaft, the access openings in the linking ring are no longer aligned with the outer access openings. To re-align the access openings, the first annular plate is disconnected from the linking ring by removing the first annular arrangement of outer fasteners, while the main shaft as well as the gearbox input shaft are locked. The gearbox input shaft and the linking ring can then be turned to a position, for example through −45°, to re-align the access openings. This can be done by an auxiliary drive unit connected to the gearbox output shaft as described above.

Turning the gearbox first stage by this amount also re-aligns the outer fastener bolt patterns in the linking ring and first coupling plate for re-assembly in a later step. In the new position, one or more of the remaining upwind-facing inner fasteners can now be adjusted by the maintenance crew, while the gearbox input shaft is locked. The first annular plate is then re-connected to the aligned linking ring using the first annular arrangement of outer fasteners, while the main shaft as well as the gearbox input shaft are locked. These steps are repeated until all of the upwind-facing inner fasteners have been adjusted by the maintenance crew.

The above maintenance procedure for the upwind- and/or downwind-facing inner fasteners is favorably straightforward and can be scheduled as part of a regular service routine. Because the fasteners can be checked relatively often, the coupling assembly does not need to be engineered to be maintenance-free over the entire service life of the drivetrain, and can instead be realized as a favorably economical structure.

In an alternative method of accessing the remaining upwind-facing inner fasteners, the main shaft is turned relative to the gearbox input shaft by an auxiliary drive unit arranged to turn the main shaft for example, or by pitching the rotor blades while the main shaft is unlocked and the gearbox input shaft is locked. To this end, the first annular plate is disconnected from the linking ring by removing the first annular arrangement of outer fasteners, while the main shaft as well as the gearbox input shaft are locked. The main shaft can then be turned to a new position, for example through 45°. Turning the main shaft results in turning the first annular plate also, but the inner access openings in the linking ring remain aligned with the outer access openings. In the new position, one or more of the remaining upwind-facing inner fasteners can now be adjusted by the maintenance crew. These steps are repeated until all of the upwind-facing inner fasteners have been adjusted. The main shaft can then be turned as appropriate to re-align the first annular plate and linking ring. The first annular plate is then re-connected to the linking ring again by re-inserting and tightening the first annular arrangement of outer fasteners.

BRIEF DESCRIPTION

Some of the embodiments will be described in detail, with references to the following figures, wherein line designations denote like members, wherein.

DETAILED DESCRIPTION

Figure 1:
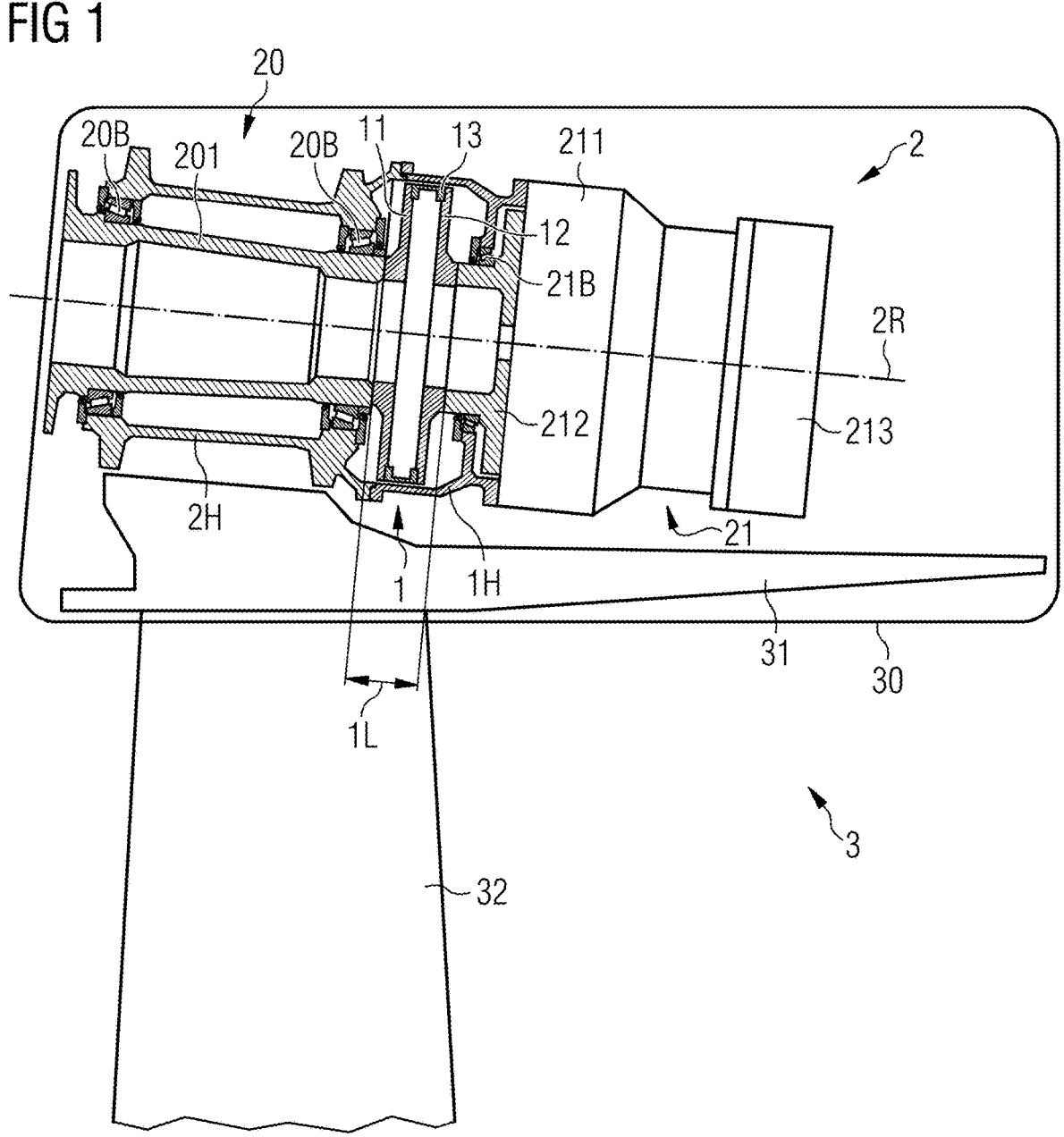
FIG. 1 shows a wind turbine drivetrain.

FIG. 1 is a schematic illustration of an exemplary wind turbine drivetrain 2 installed inside a nacelle 30, which is supported by a tower 32 of the wind turbine 3 (for clarity, the aerodynamic rotor is not included in the drawing). By means not shown here but familiar to the skilled person, the low-speed unit 20 of the drivetrain 2 is secured to a bedplate 31, which in turn is connected to the top of the tower 32 so that drivetrain load is transferred to the tower 32.

In this exemplary embodiment, the wind turbine can have a rated power output in the order of 5 to 20 MW, and the aerodynamic rotor of the wind turbine can have a diameter of 160 m or more. The main shaft 201 of the drivetrain 2 of such a wind turbine 3 can turn at a relatively slow rate, for example 8-12 rpm when the wind turbine is operating at its rated speed. To support the low-speed shaft 201, a main bearing arrangement is provided comprising front and rear bearings 20B at either end of the low-speed shaft 201. A housing 2H encloses the bearings 20B and most of the low speed shaft 201, and is sealed to prevent contaminants from entering or leaving the housing 2H. This housing 2H is secured to the bedplate 31.

A high-speed unit 21 comprising gearbox 211 and generator 213 is mounted to the low-speed unit 20 by ng assembly 1. Here, the high-speed unit 21 comprises a planetary gearbox 211 with several stages. The generator 213 is mounted to the non-drive end of the gearbox 211 in cantilever fashion. The high-speed unit 21 of such a drivetrain 2 can weigh in the order of 40-80 metric tons.

The low-speed shaft 201 must be connected in some way to the planetary gears of the gearbox first stage 212. Instead of connecting the non-drive end of the low-speed shaft 201 directly to the gearbox first stage 212, a coupling assembly 1 is used as shown here. This coupling assembly 1 is constructed to be as short as possible, i.e., to connect the low-speed shaft 201 to the gearbox 211 as directly as possible for optimal torque transfer. In an exemplary embodiment of the invention, the length of the drivetrain 2 can be in the order of 6-10 m, and the total axial length 1L of the coupling assembly 1 is at most 1 m and can be shorter, for example the axial length 1L can be as short as 70 cm.

Figure 2:
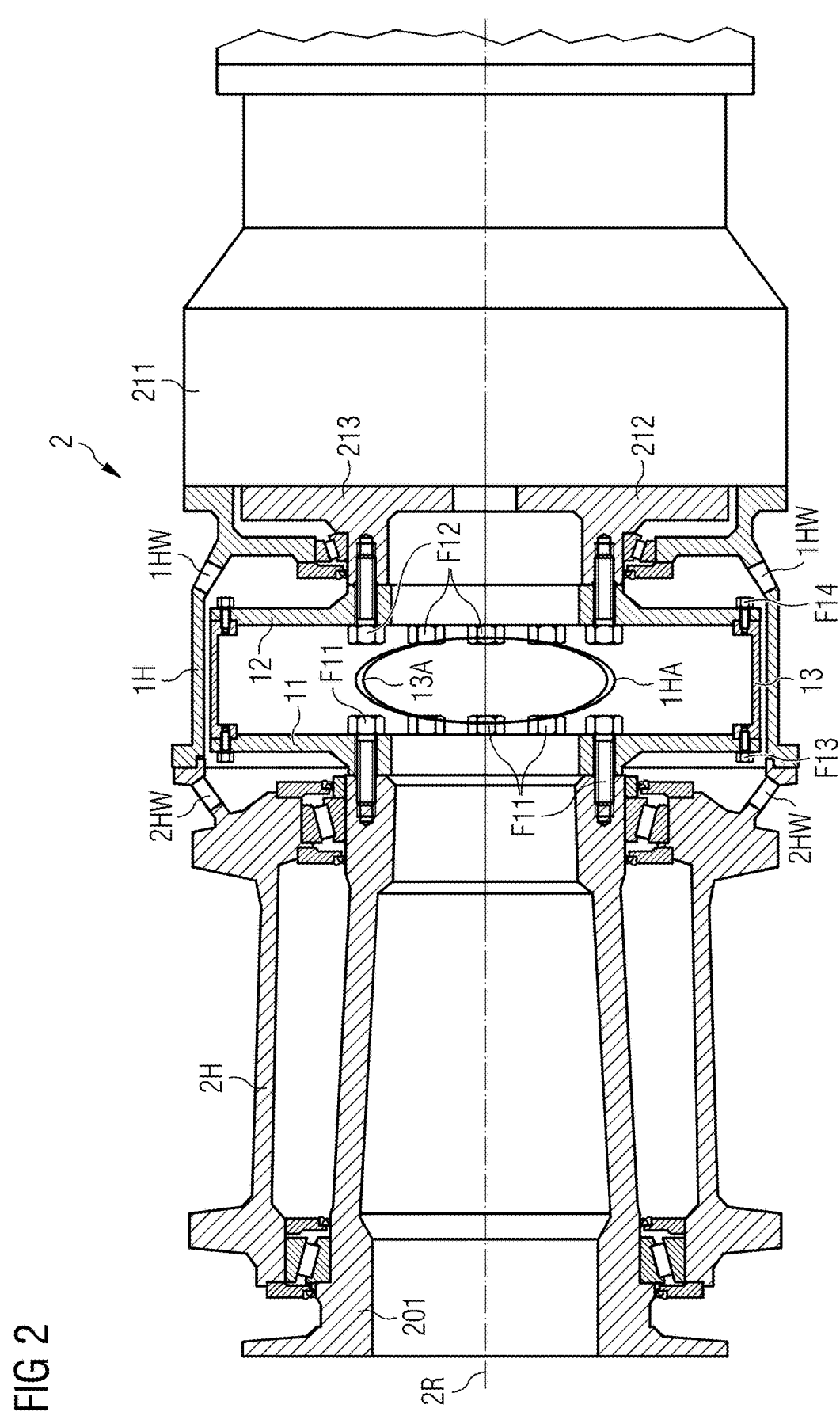
FIG. 2 shows a simplified side elevation view of the drivetrain.

FIG. 2 shows a simplified side elevation view of the inventive drivetrain 2, showing some components in cross-section. The diagram shows the main shaft 201 and planetary gearbox 211 joined by an embodiment of the inventive coupling assembly 1. A housing 1H encloses the coupling assembly 1. The upwind end of the coupling housing 1H is secured to the downwind end of the main bearing housing 2H by a flange connection. The downwind end of the coupling housing 1H is secured to the first stage 212 of the planetary gearbox 211. As shown here, a bearing 21B is provided between the stationary coupling housing 1H and the rotary gearbox first stage 212.

The coupling assembly 1 comprises two annular disks or plates 11, 12 which have the same outer diameter. These annular plates 11, 12 are joined about their outer perimeters by a relatively short annular connecting part 13 (also referred to as a "hollow shaft" or "linking ring"). One annular plate 11 is connected to the low-speed shaft 201, and the other annular plate 12 is connected to the gearbox first stage 212. The plates 11, 12 extend radially outward, i.e., the outer diameter of an annular plate is larger than the diameter of the downwind end of the low-speed shaft 201. The flexibility of the annular plates 11, 12, in combination with the spatial separation achieved by the connecting part 13, allows for radial as well as angular displacement of the gearbox first stage 212 relative to the low-speed shaft 201.

Each annular part 11, 12 of the coupling assembly 1 has an essentially flat rim extending radially from a central aperture. The first annular part 11 is bolted to the main shaft 201 by an annular arrangement of axially aligned fasteners F11 inserted in the upwind direction (for example an annular arrangement of eight equidistantly spaced bolts with a size in the order of M48-M100); the second annular part 12 is bolted to the gearbox first stage 212 by an annular arrangement of axially aligned fasteners F12 inserted in the downwind direction (for example a corresponding annular arrangement of eight bolts). These fasteners F11, F12 are only accessible from the interior of the coupling assembly 1.

As shown here, the stationary coupling assembly housing 1H has an outer access opening 1HA, and the rotary hollow shaft 13 of the coupling assembly 1 has a matching an inner access opening 13A. In this embodiment, the openings 13A, 1HA are essentially the same size, and align when the main shaft 210 has been turned to the corresponding position. This can be a predetermined locking/maintenance position, for example, i.e., a shut-down procedure of the wind turbine can conclude with the main shaft 201 in the position shown here, to result in alignment of the openings 13A, 1HA so that a technician can reach in and access the fasteners F11, F12. The diagram also shows the connection between the annular parts 11, 12 and the linking ring 13. The fasteners F13 used to attach the linking ring 13 to the coupling parts 11, 12 can be accessed through smaller openings or "windows" 2HW, 1HW formed about the housings 2H, 1H.

Figure 3:
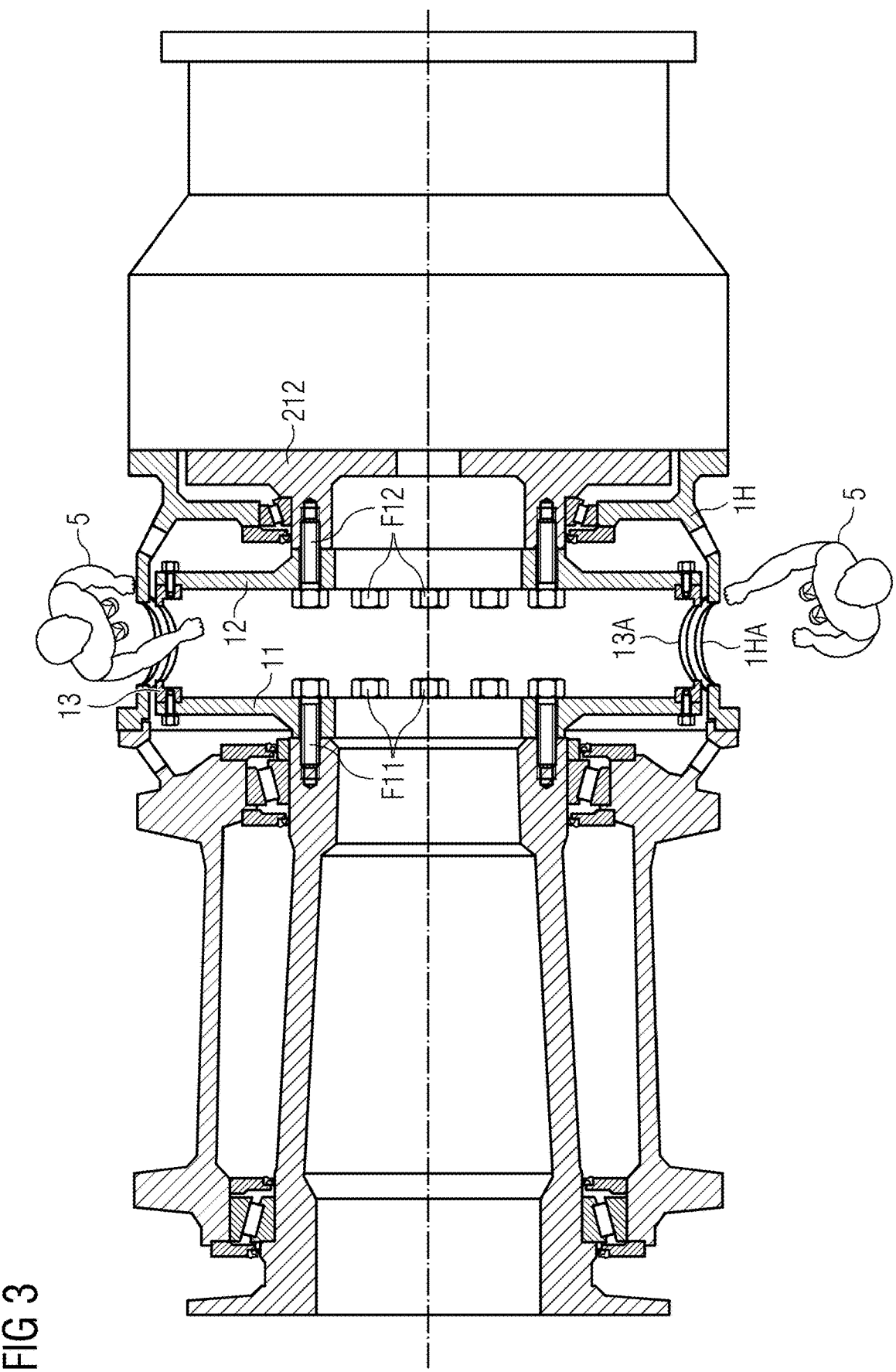
FIG. 3 shows a simplified plan view of the drivetrain.

This exemplary drivetrain embodiment is shown in a simplified plan view in FIG. 3. In this exemplary embodiment, the rotary hollow shaft 13 of the coupling assembly 1 has two diametrically opposed apertures 13A, and the coupling assembly housing 1H also has two diametrically opposed matching apertures 1HW. Here, the aligned openings 1HA, 13A allow technicians 5 on both sides of the drivetrain 1 to reach in and access one or more of the fasteners F11, F12, for example to check the preload values of the fasteners F11, F12. By allowing straightforward access for this purpose, relatively economical fasteners F11, F12 can be used to construct the coupling assembly 1, and there is no need to design the coupling assembly to be "maintenance-free".

Figure 4:
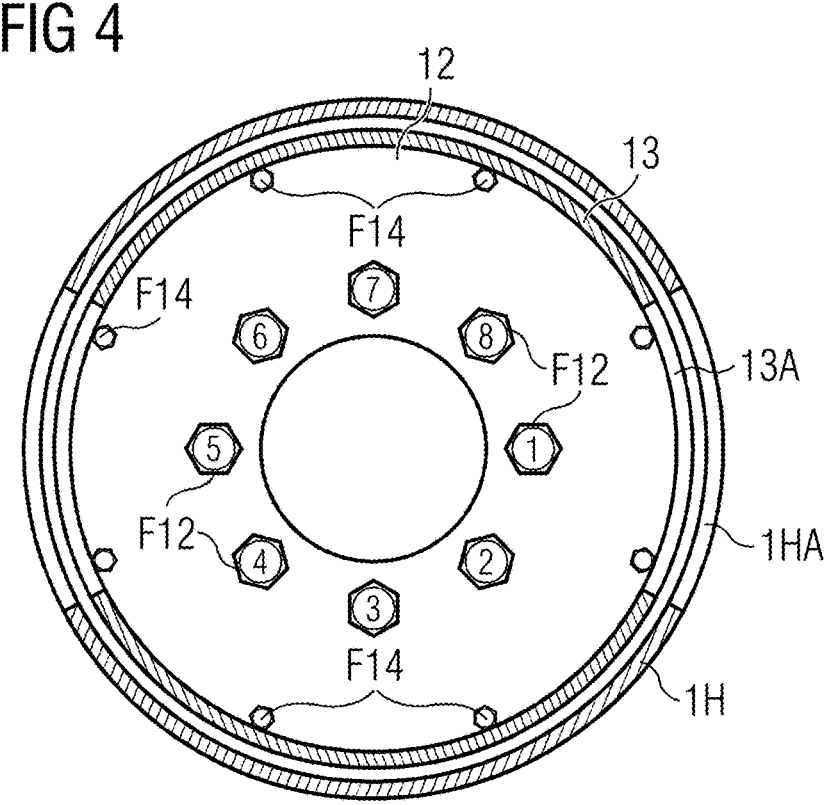
FIG. 4 illustrates the access openings are shown to be aligned, allowing a technician to access the two diametrically opposed bolts labelled "1" and "5
Figure 5:
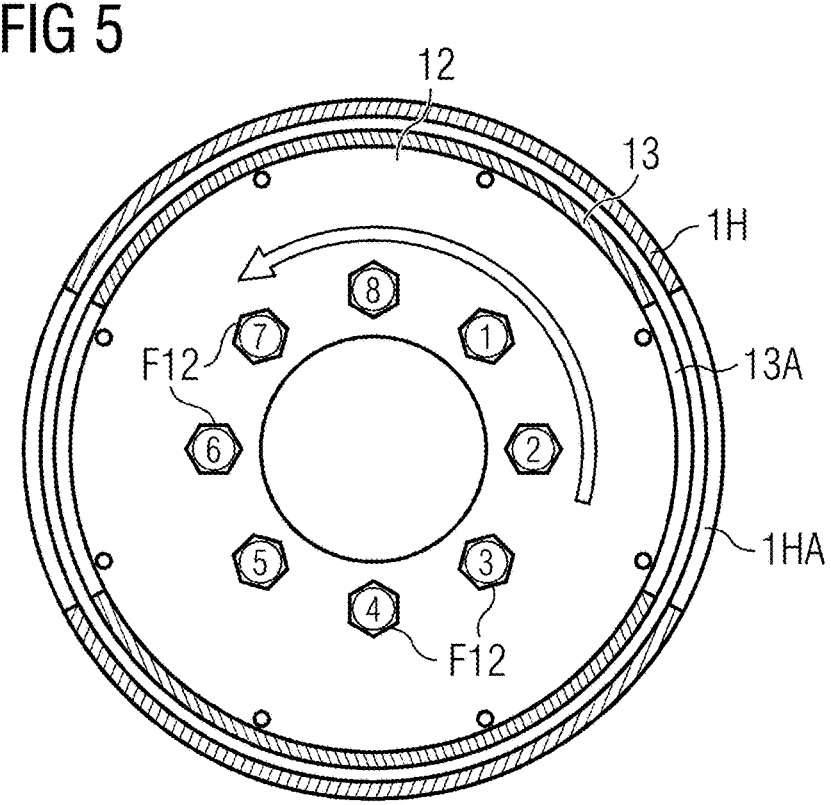
FIG. 5 illustrates the outer fasteners have been removed, disconnecting the second annular plate from the linking ring.
Figure 6:
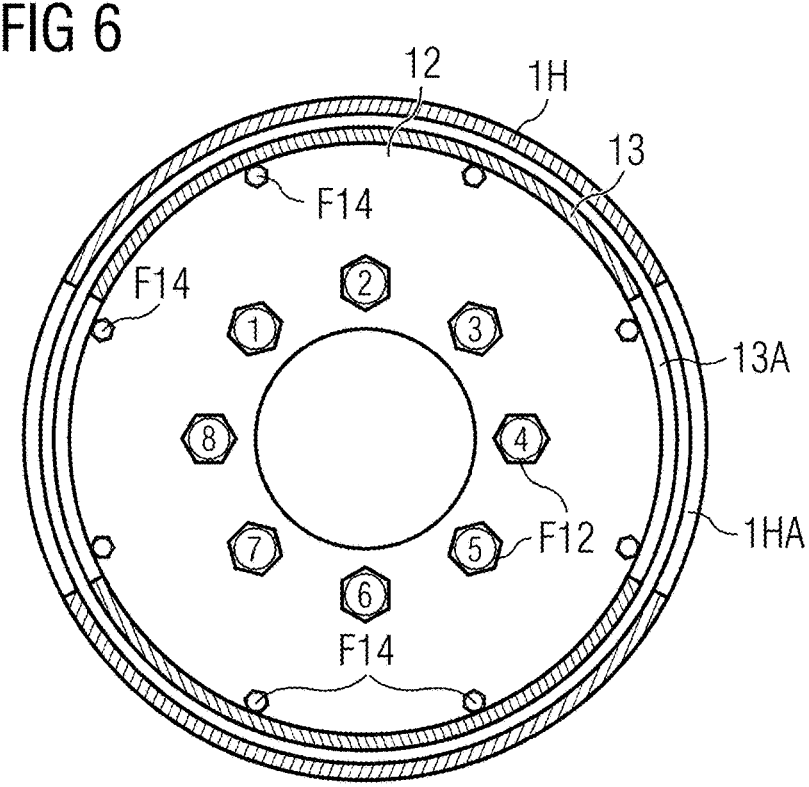
FIG. 6 illustrates show an elevation view onto the second annular plate.
Figure 7:
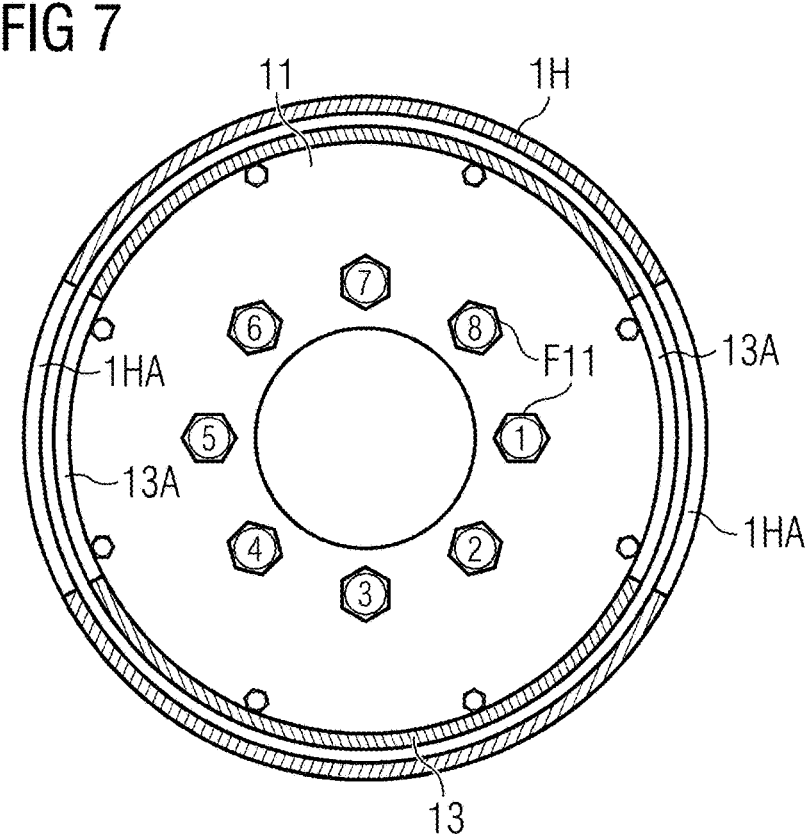
FIG. 7 illustrates the access openings are shown to be aligned.
Figure 8:
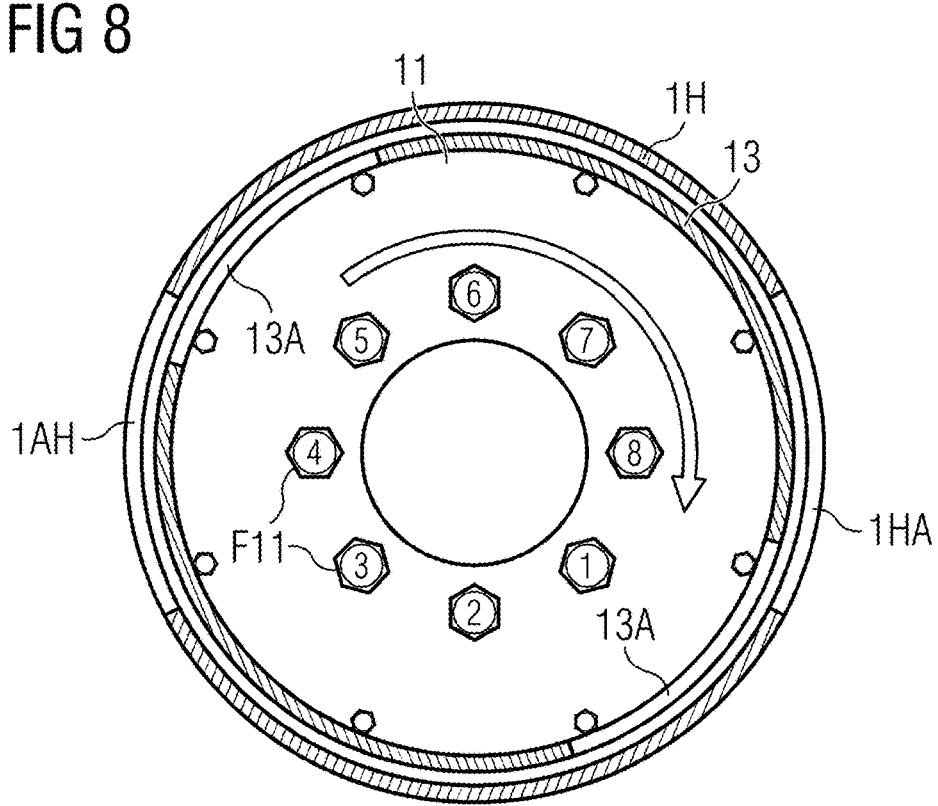
FIG. 8 illustrates the access openings are shown to be no longer aligned.
Figure 9:
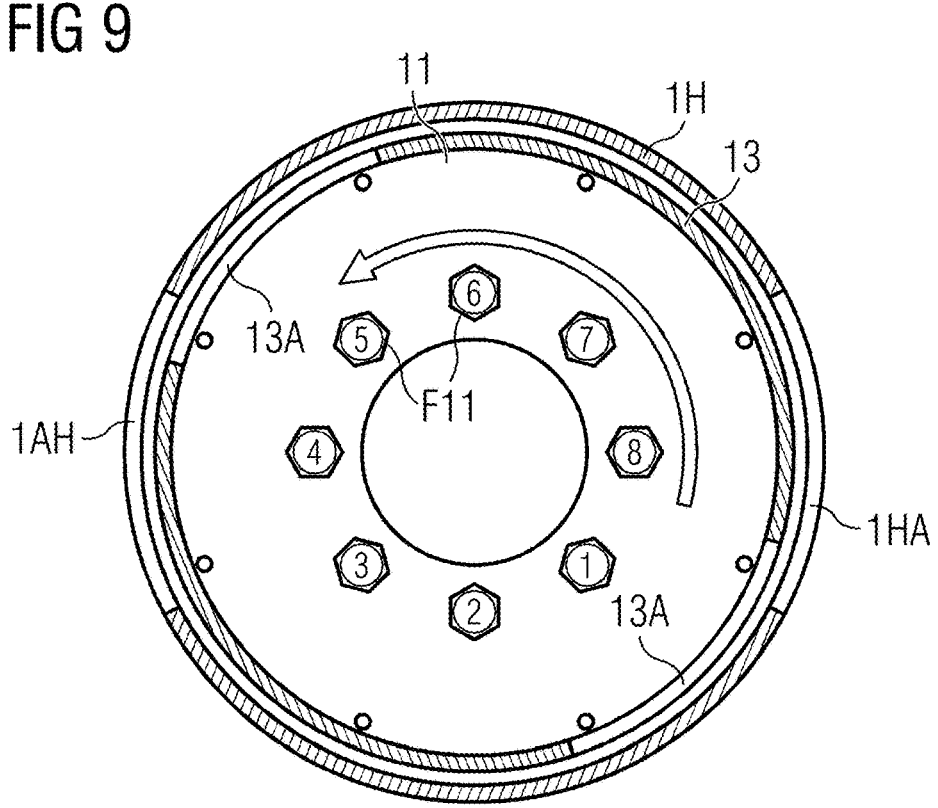
FIG. 9 illustrates all outer fasteners have been removed.
Figure 10:
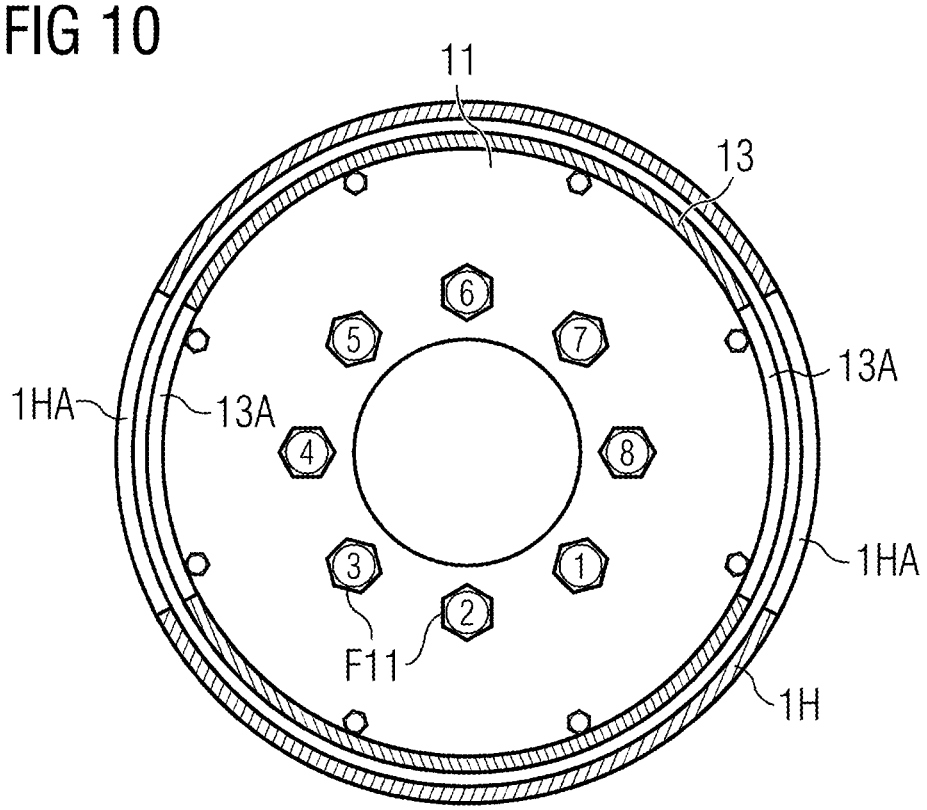
FIG. 10 illustrates the access openings are realigned.

FIGS. 4-10 illustrate steps of a two-stage maintenance procedure to adjust the fasteners F11, F12. FIGS. 4-6 each show an elevation view onto the second annular plate 12 (looking in the downwind direction) to illustrate steps of a first stage of the procedure, in which the downwind facing fasteners F12 are adjusted. In FIG. 4, the access openings 13A, 1HA are shown to be aligned, allowing a technician to access the two diametrically opposed bolts F12 labelled "1" and "5". In FIG. 5, the outer fasteners F14 have been removed, disconnecting the second annular plate 12 from the linking ring 13. This allows the gearbox first stage (together with the second annular plate 12) to be turned independently of the linking ring, first annular plate and main shaft (step D1). Rotation of the second annular plate 12 (and gearbox input shaft) is indicated by the arrow, and the diagram shows that access to diametrically opposed bolts F12 labelled "2" and "6" is now possible (step D2). These steps D1 and D2 are repeated until the maintenance crew has given access to diametrically opposed bolts F12 labelled "4" and "8" as shown in FIG. 6. In a final step, after any necessary rotation of the gearbox first stage, the second annular plate 12 is connected once again to the linking ring 13 using the outer fasteners F14. FIGS. 7-10 each show an elevation view onto the first annular plate 12 (looking in the upwind direction) to illustrate steps of a second stage of the procedure, to access the upwind-facing fasteners F11. In FIG. 7, the access openings 13A, 1HA are shown to be aligned, allowing a technician to access the two diametrically opposed bolts F11 labelled "1" and "5". To access further upwind-facing inner fasteners F11, the main shaft is unlocked and turned (step U1) into a new position, for example through 45°, together with the coupling assembly 11, 12, 13 and the gearbox input shaft as described above. For this step, the first coupling plate 11 and linking ring 13 can be connected by a reduced set of outer fasteners F13, the remaining fasteners F13 having been removed. At the new position as indicated in FIG. 8, the access openings 13A in the linking ring 13 are no longer aligned with the outer access openings 1HA. In FIG. 9, all outer fasteners F13 have been removed, disconnecting the first annular plate 11 from the linking ring 13 (step U2). The gearbox first stage is then turned by a suitable amount, causing the linking ring 13 (via the second annular plate 12) to be turned in the reverse direction and independently of the first coupling plate 11, in order to re-align the access openings 13A, 1HA as shown in FIG. 10 (step U3). The diametrically opposed bolts F11 labelled "8" and "4" are now accessible for maintenance (step U4). The reduced set of outer fasteners F13 is then installed to re-connect the first coupling plate 11 and linking ring 13 (step U5). These steps U1-U5 are repeated until the maintenance crew has been given access to the remaining upwind-facing bolts F11. In a final step, the gearbox first stage is turned to re-align the outer fastener bolt patterns in the linking ring 13 and first annular plate 11, and these are connected once again using the complete set of outer fasteners F13.

Figure 11:
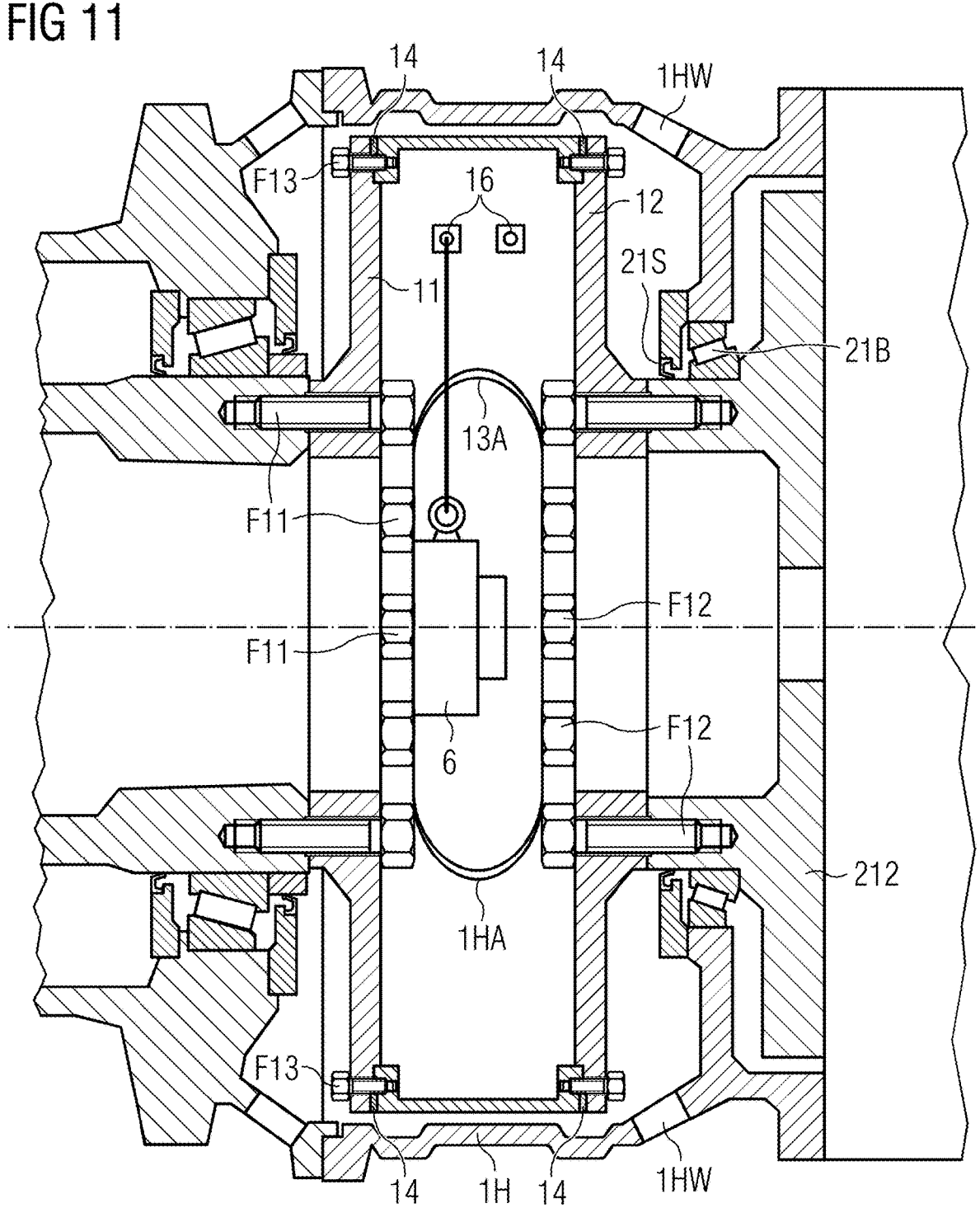
FIG. 11 shows a stage during a maintenance procedure in the drivetrain.

FIG. 11 shows a further stage during a maintenance procedure in the embodiments of FIG. 2 and FIG. 3. The diagram shows a set of shims 14 between the linking ring and the first annular plate 11, and a set of shims 14 between the linking ring and the second annular plate 12. The purpose of the shims 14 is to leave a gap between the linking ring and an annular plate when the shims are removed, so that the drivetrain component on one side of the coupling assembly (e.g., the main shaft) can be turned relative to the drivetrain part on the other side of the coupling assembly (e.g., the gearbox input shaft). Here, fasteners F14 between the linking ring 13 and the second annular part 12 have been removed, so that shims 14 can be adjusted as necessary. To facilitate this procedure, the coupling housing 1H is shaped as indicated, with "bulges" formed adjacent to the access apertures 1HW, 2HW, allowing shims 14 to be handled as necessary.

The diagram also shows a bracket 16, located in the inside of the linking ring, that can be used to support a power tool 6 (indicated by the ghost lines) during a step of performing maintenance on the fasteners F11, F12.

The step of detaching an annular plate from the linking ring 13 can be required in a preparatory stage of a more complex maintenance procedure, for example when access is needed to the bearing 21B and/or its seal 21B, which may require maintenance at some point during the wind turbine service life. Equally, access to the gearbox front end may be needed for some maintenance task. To this end, after releasing the fasteners F14 from the second annular plate 12, the coupling housing 1H is detached from the main bearing housing 2H, and the entire high-speed assembly 21, 22 can then be displaced in the downwind direction using a suitable lifting apparatus to facilitate access to the components at the gearbox front end. Similarly, access to the downwind end of the main shaft 201 may be needed for some maintenance task. To this end, after releasing the fasteners F14 from the first annular plate 11, the coupling housing 1H is detached from the main bearing housing 2H. Again, the entire high-speed assembly 21, 22—this time including the second annular plate 12 and the hollow shaft 13—can then be displaced in the downwind direction to facilitate access to the components at the non-drive end of the main shaft 201.

Figure 12:
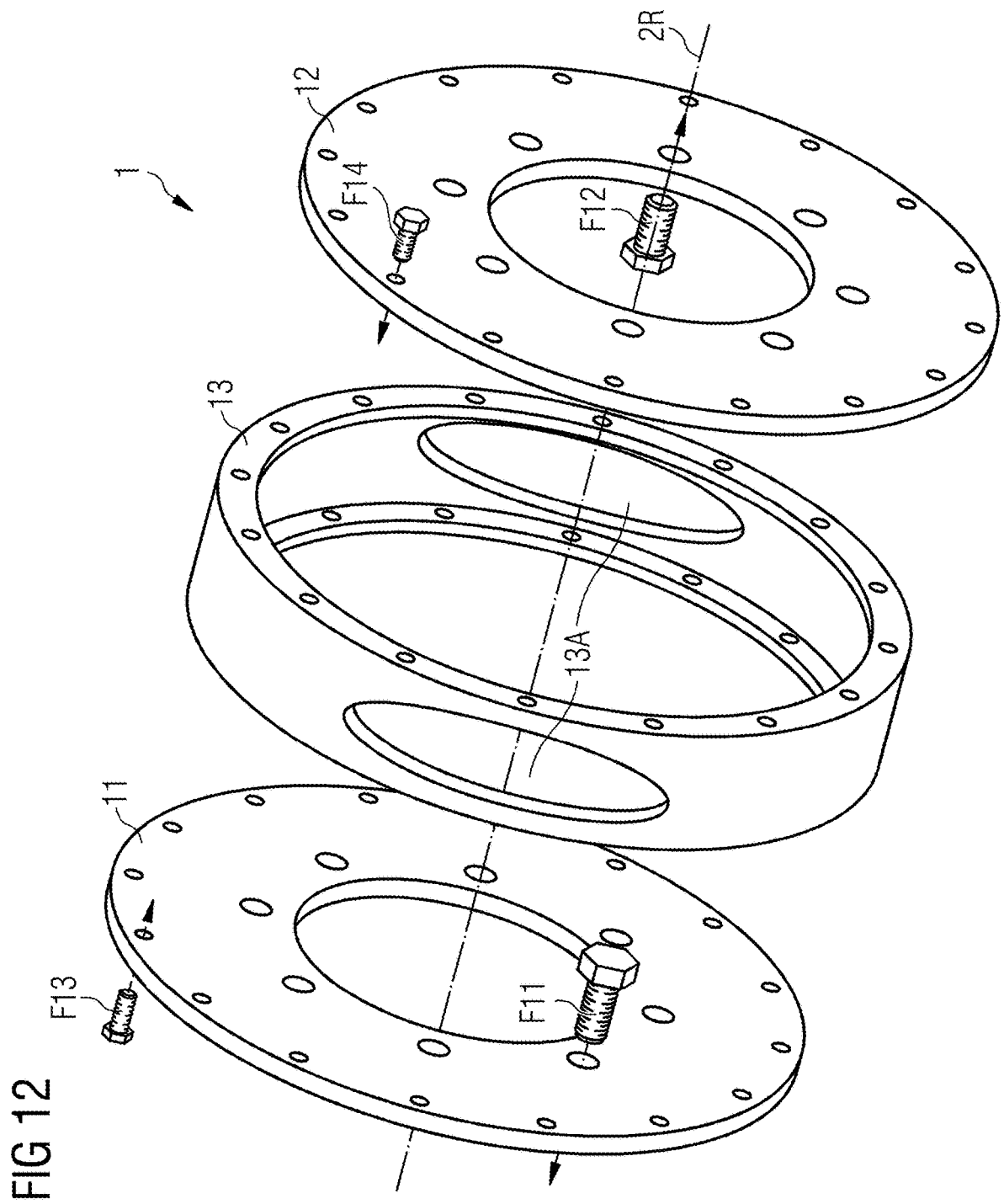
FIG. 12 shows an exploded view of the coupling assembly of an embodiment of the drivetrain.

FIG. 12 is an explosion drawing of an exemplary embodiment of the coupling assembly 1 used in the inventive drivetrain, relative to the drivetrain rotation axis 2R. The diagram shows that each coupling plate 11, 12 is an essentially solid annular part extending from a central aperture to its outer circumference, with threaded bores 11B, 12B to receive large bolts F11, F12 as described above, for connecting the upwind annular plate 11 to the main shaft and for connecting the downwind annular plate 12 to the gearbox first stage. These fasteners F11, F12 can be accessed through apertures 13A in the linking ring 13, when these apertures 13A are brought into alignment with corresponding apertures in the stationary coupling housing 1H as described above. For a coupling assembly 1 with an outer diameter in the order of of 2.5 m and an axial length in the order of 1 m, an access opening 13A can have an elliptical shape with a width of about 0.3 m and a height of about 0.6 m. These dimensions can be sufficient to allow a technician to reach in with a tool for checking the preload of the fasteners F11, F12, for example.

About its outer perimeter, each plate 11, 12 has smaller bores to receive the outer fasters F13, F14. The hollow shaft 13 or linking ring 13 has inwardly-facing flanges with threaded bores to receive the outer fasteners F13, F14. These fasteners F13, F14 can be accessed through small windows or access apertures 1HW, 2HW about the housings 1H, 2H as described above.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine drivetrain comprising:
a low-speed shaft;
a high-speed assembly comprising a planetary gearbox and a generator;
a coupling assembly comprising a first annular part connected to the low-speed shaft, a second annular part connected to a first stage of the planetary gearbox, and a cylindrical intermediate part extending between the annular parts; and
a drivetrain housing arranged to enclose the low-speed shaft and the coupling assembly;
wherein,
an outer access opening is formed in the drivetrain housing; and
an inner access opening is formed in the intermediate part of the coupling assembly and arranged to align with the outer access opening to facilitate access to the interior of the coupling assembly.

2. The wind turbine drivetrain according to claim 1, wherein the first annular part is secured to the low-speed shaft by a first annular arrangement of axial fasteners.

3. The wind turbine drivetrain according to claim 1, wherein the second annular part is secured to the first stage of the planetary gearbox by a second annular arrangement of axial fasteners.

4. The wind turbine drivetrain according to claim 1, wherein the drivetrain housing comprises a housing section adapted to enclose a bearing arrangement about the low-speed shaft, and a separate housing section arranged to enclose the coupling assembly.

5. The wind turbine drivetrain according to claim 1, wherein at least one of the first annular part and the second annular part of the coupling assembly is secured to the intermediate part of the coupling assembly by an arrangement of outer fasteners.

6. The wind turbine drivetrain according to claim 5, wherein the drivetrain housing comprises a number of apertures arranged to facilitate access to the arrangement of outer fasteners.

7. The wind turbine drivetrain according to claim 1, wherein the coupling assembly comprises an arrangement of shims between the intermediate part and at least one of the first annular part and the second annular part, and wherein a shim is dimensioned to fit through an opening of the drivetrain housing.

8. The wind turbine drivetrain according to claim 1, comprising at least one bracket arranged in the interior of the coupling assembly to support a maintenance tool.

9. A method of performing a maintenance procedure, comprising:
providing a wind turbine drivetrain having a low-speed shaft, a high-speed assembly comprising a planetary gearbox and a generator, a coupling assembly comprising a first annular part connected to the low-speed shaft, a second annular part connected to a first stage of the planetary gearbox, and a cylindrical intermediate part extending between the annular parts, and a drivetrain housing arranged to enclose the low-speed shaft and the coupling assembly, wherein an outer access opening is formed in the drivetrain housing and an inner access opening is formed in the intermediate part of the coupling assembly and arranged to align with the outer access opening to facilitate access to the interior of the coupling assembly;
turning a drivetrain unit to align the inner access opening with the outer access opening;
inserting a tool through the aligned openings into the interior of the coupling assembly; and
manipulating a fastener using the tool.

10. The method according to claim 9, wherein the step of turning a drivetrain unit comprises effecting a rotation of the low-speed shaft.

11. The method according to claim 9, wherein the step of turning a drivetrain unit comprises effecting a rotation of the gearbox first stage.

12. The method according to claim 9, wherein the step of manipulating a fastener using the inserted tool comprises checking the preload of the fastener and/or adjusting the preload of the fastener.

13. The method according to claim 9, comprising a step of disconnecting an annular part from the intermediate part to facilitate rotation of a first drivetrain unit relative to a second drivetrain unit.

14. The method according to claim 2, wherein maintenance of the second annular arrangement of axial fasteners comprises steps of:
- mounting an auxiliary drive unit to a component of the high-speed assembly to effect a rotation of the second annular part;
- disconnecting the second annular part from the intermediate part;
- D1) actuating the auxiliary drive unit to turn the second annular part to a position in which a number of the fasteners are accessible through the aligned access opening;
- D2) performing maintenance on the accessible fasteners;
- repeating steps D1 and D2 until maintenance of the second annular arrangement of axial fasteners has been completed; and
- connecting the second annular part to the intermediate part.

15. The method according to claim 9, wherein maintenance of the first annular arrangement of axial fasteners comprises steps of:
- mounting an auxiliary drive unit to a component of the high-speed assembly to effect a rotation of the second annular part;
- U1) actuating the auxiliary drive unit to turn the low-speed shaft through a fraction of a revolution;
- U2) disconnecting the first annular part from the intermediate part;
- U3) actuating the auxiliary drive unit to align the access openings;
- U4) performing maintenance on the accessible fasteners;
- U5) connecting the first annular part to the intermediate part;
- repeating steps U1-U5 until maintenance of the first annular arrangement of axial fasteners has been completed.

* * * * *